G. MURRAY, Jr.

Water Gage.

No. 95,503.

Patented Oct. 5, 1869.

WITNESSES:

INVENTOR:
George Murray Jr.
by Prindle and Dyer
Attorneys

UNITED STATES PATENT OFFICE.

GEORGE MURRAY, JR., OF CAMBRIDGEPORT, MASSACHUSETTS.

IMPROVEMENT IN WATER-GAGES.

Specification forming part of Letters Patent No. 95,503, dated October 5, 1869.

*To all whom it may concern:*

Be it known that I, GEORGE MURRAY, Jr., of Cambridgeport, in the county of Middlesex, and in the State of Massachusetts, have invented certain new and useful Improvements in Water-Gages; and I do hereby declare that the following is a full, clear, and exact description thereof, reference being had to the accompanying drawings, making a part of this specification, in which—

Figure 1:
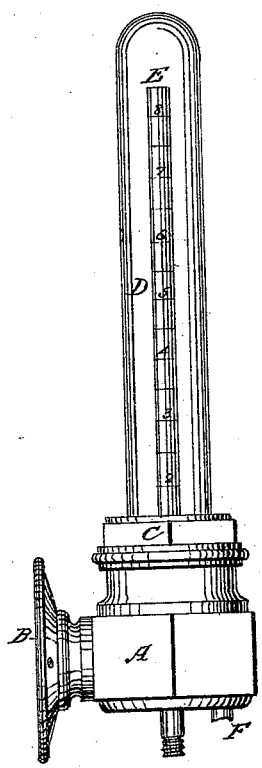
Figure 2:
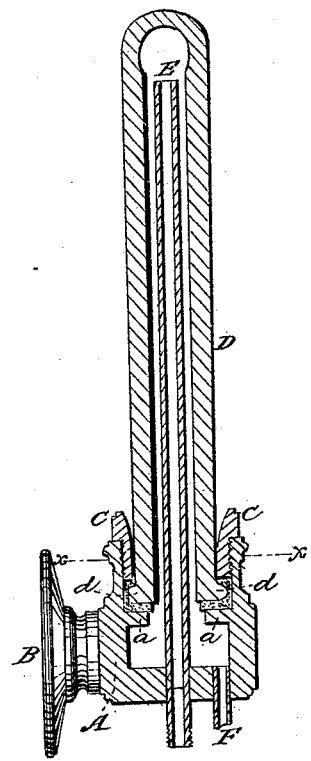
Figure 3:
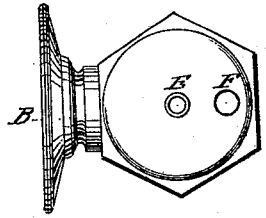
Figure 4:
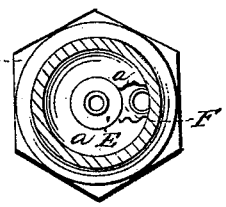

Figure 1 is a side elevation of my improved gage. Fig. 2 is a vertical central section of the same. Fig. 3 is a plan view of the base; and Fig. 4 is a transverse section on the line $x\ x$ of Fig. 2.

Letters of like name and kind refer to like parts in each of the figures.

In water-gages of ordinary construction a glass tube is confined at either end within a stuffing-box or other equivalent mechanical device, upon the end of a pipe passing through the shell of the boiler, above or below the water-line, so as to furnish a free communication between the interior of said boiler and of said pipe and allow the water to rise and fall in the latter in accordance with the changes in its level within the former. This method of constructing the gage is, however, open to serious objections, as, by reason of the unequal expansion of the metallic and glass portions, the latter is frequently broken and requires replacing, at a considerable loss of time, patience, and money. To obviate these objections is the object of my invention, which consists in the employment of a glass tube open at one end and containing within its cavity a metallic tube, the former being in communication with the water-space and the latter with the steam-space of the boiler.

It also consists in the peculiar construction and arrangement of the several parts, as is hereinafter fully set forth.

In the annexed drawings, A represents the base of the gage, consisting of a metallic socket provided at one side with a circular disk or bracket B, secured at a right angle therewith and forming a part of the same, by means of which said socket can be secured to the vertical portion of a boiler. Midway between the top and bottom of the socket is a ledge or contraction $a$, its upper surface being at a right angle to the bore of said socket and forming the bottom of a stuffing-box, in which is fitted a gland C, having upon its periphery a male screw-thread corresponding with a female screw-thread upon the inner side of the walls of said stuffing-box.

D represents a glass tube open at its lower end, where it is provided with a projecting flange $d$, of a suitable size to pass freely into the stuffing-box. The opening in the gland being of a size to enable it to pass over the tube D, it will be readily seen that by placing ordinary rubber or hemp packing above and below said flange, and screwing down said gland, a steam-tight joint will be produced between the lower end of the tube and the ledge $a$.

Passing upward through the bottom of the socket A, at its center, is a metallic pipe E, which has an outside diameter equal to about one-half the inside diameter of the glass tube, and extends upward to within a short distance of its upper end. The surface of the pipe E is divided longitudinally into inches, or subdivisions of an inch, by a series of concentric lines, and the scale thus formed serves to show the relative height of the water above the flues or crown-sheet, the gage being usually placed so that its lower end, or O, upon the scale will correspond in height with the top of said flues or with said sheet.

F represents a pipe passing downward through the bottom of the socket A at one side, and communicating with the interior of the boiler below the water-line, by which means water is freely admitted to the socket and tube, while the pipe E, being placed in communication with the steam-space within the boiler, is filled with steam having a pressure equal to that of said water, whereby the latter freely rises or falls within said tube, and at all times corresponds in height to that within the boiler.

As constructed, the gage performs its office with as much certainty and accuracy as though the upper end of the glass tube were open and communicated directly with the steam-space of the boiler, while from the form of said tube and the means employed for securing it within the socket all liability to injury from its expansion or contraction, or that of any of the other parts of the gage, is entirely avoided, and great durability is secured.

Having thus fully set forth the nature and merits of my invention, what I claim as new, and desire to secure by Letters Patent, is—

1. The glass tube D, constructed as described, in combination with the pipe E, substantially as and for the purpose specified.

2. The socket A, provided with the stuffing-box and gland, in combination with the tube D and pipes E and F, substantially as shown, and for the purpose described.

3. The within-described water-gage, consisting of the socket A, provided with the stuffing-box and gland, the glass tube D, and the pipes E and F, all constructed and arranged substantially as and for the purpose set forth.

In testimony that I claim the foregoing I have hereunto set my hand this 2d day of August, 1869.

GEORGE MURRAY, Jr.

Witnesses:
LUTHER L. PARKER,
J. W. HAMMOND.